Figure 1:
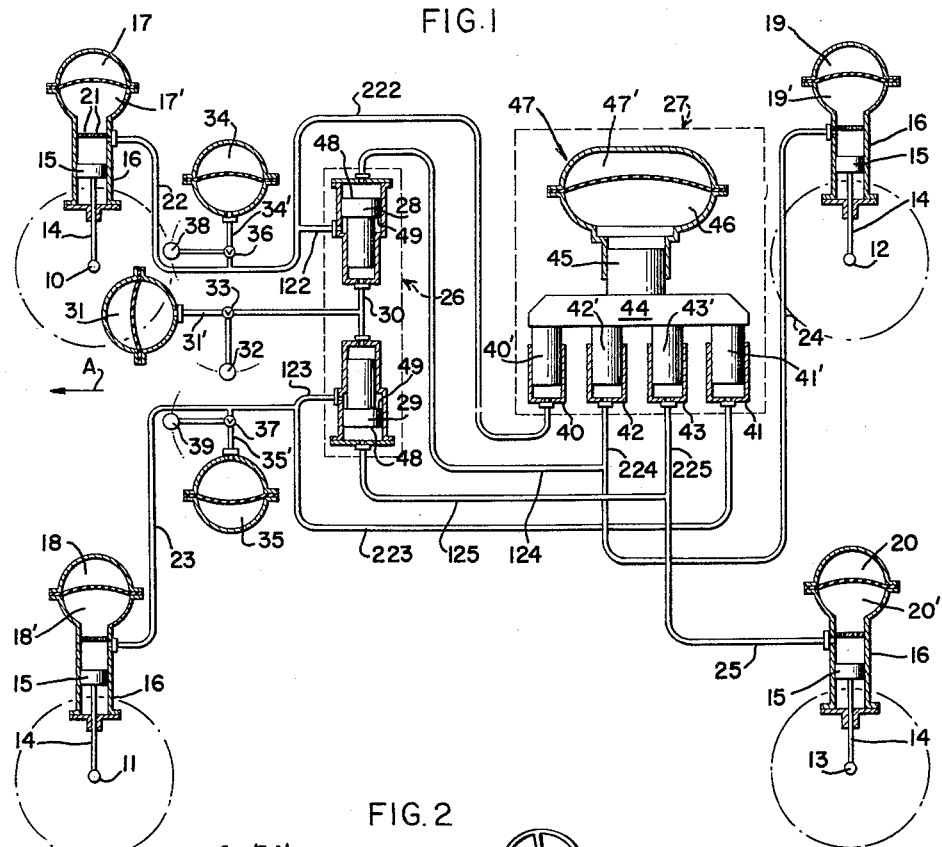

Dec. 11, 1962  E. J. H. FIALA  3,068,023
EQUALIZATION SPRING SYSTEM FOR VEHICLES, ESPECIALLY
MOTOR VEHICLES
Filed Nov. 21, 1958

INVENTOR
ERNST J. H. FIALA

BY *Dicke and Craig*

ATTORNEYS 3,068,023
EQUALIZATION SPRING SYSTEM FOR VEHICLES, ESPECIALLY MOTOR VEHICLES
Ernst J. H. Fiala, Sindelfingen, Kreis Boblingen, Germany, assignor to Daimler-Benz Aktiengesellschaft, Stuttgart-Unterturkheim, Germany
Filed Nov. 21, 1958, Ser. No. 775,560
Claims priority, application Germany Nov. 26, 1957
27 Claims. (Cl. 280—124)

The present invention relates to an equalization spring system for vehicles, particularly motor vehicles, and essentially consists in that springs are effective or act on the force transmission between the wheels and the equalization installation and/or on the force transmission between the individual parts of the equalization arrangement which springs may be engaged or disengaged, i.e., which may be selectively rendered effective or ineffective.

It is known that equalization spring systems establish relations between the forces and spring movements of the individual wheels which in certain operating conditions have a desirable, advantageous effect, which on the other hand, however, are not particularly favorable for certain other operating conditions. The present invention makes it possible to obtain with the use of a spring equalization system, a favorable behavior and response of the vehicle also in those last-mentioned cases by appropriately operatively engaging and disengaging these springs, i.e., by appropriately rendering the same effectual and ineffectual in which this would not be the case with continuously effective springs and equalization arrangement.

The arrangement in accordance with the present invention may be so made in installations with a hydraulic or pneumatic force-transmitting medium that the equalization installation is provided with two pistons which are loaded or acted upon by a pressure force derived from a respective front and rear wheel each on both sides of each piston having differently effective piston surfaces and which are hydraulically interconnected with each other whereby the hydraulic connecting medium is subjected to the action of a spring, particularly of a hydropneumatic spring, adapted to be operatively connected and disconnected, i.e., adapted to be rendered effective and ineffective. By the use of this hydropneumatic spring, a vehicle spring system is realized in accordance with the present invention which is very soft with uni-directional shocks at both wheels of one axle as a result of the response of this spring.

However, in order that this spring softness does not result during acceleration or braking of the vehicle in disagreeable nodding or nose-diving movements, this spring is operatively disconnected or rendered ineffectual during acceleration or braking of the vehicle. This may be controlled by any appropriate inertia mass, for example, by a pendulum, however, it is also possible to control the engaging and disengaging device for this spring by the brake and/or the gas pedal of the vehicle.

In order to obtain a particularly soft spring characteristic with unidirectional shocks on both wheels of one vehicle side, additional springs adapted to be operatively connected or disconnected, i.e., adapted to be rendered effective or ineffective may be provided which are operative on the force transmission between the wheels and the equalization installation. In order to obtain a relatively large resistance against curve tilting or curve inclination of the vehicle body while driving through a curve, notwithstanding the relatively soft spring characteristic in case of uni-directional shocks on the wheels of one vehicle side, these additional springs are operatively disconnected or rendered ineffective while driving through a curve. This control may be also obtained by means of any suitable inertia mass, for example, a pendulum. However, the operative engagement and disengagement of the spring may also be operatively connected with the steering member.

A particularly soft spring characteristic of the vehicle parallel to the road bed or road surface may be obtained if the force absorbed by each individual wheel is supplied over a branching or distribution arrangement one branch of which leads to a common spring and the other branch of which leads to an equalization spring system, as also described in my copending application, Serial No. 775,509, filed November 21, 1958, now Patent No. 3,032,349, and entitled Equalization Spring System for Vehicles. With an installation with a force transmission by means of a hydraulic or pneumatic medium, the common spring, for example, a hydropneumatic spring may include a common rigid tensioning element which is loaded or acted upon by the transmission medium branches coordinated to the individual wheels.

In addition to the common spring, the present invention proposes to provide also individual springs for the individual wheels, for example, in such a manner that the force absorbed by a respective wheel is subdivided in a branch leading to the equalization installation and in a branch leading to a spring supported in proximity to the wheel at a relatively stationary part of the vehicle, such as the frame, the self-supporting vehicle body, the superstructure thereof, et cetera.

Accordingly, it is an object of the present invention to provide a spring equalization system which may be readily adapted to the different driving conditions and spring movements which may occur while driving the vehicle.

Another object of the present invention is the provision of an equalization spring system in which the spring characteristics are automatically matched to the different conditions so as to produce the most desirable spring characteristics for the vehicle.

Still another object of the present invention is the provision of a spring equalization system having means to render certain springs selectively inoperative so as to provide the particularly desirable spring characteristic desired for the particular spring movements at the vehicle wheels.

A still further object of the present invention is the provision of an equalization spring system for motor vehicles in which relatively soft spring characteristics are obtainable under certain conditions and which is provided with means so as to assure relatively stiff spring characteristics under other driving conditions.

Figure 2:
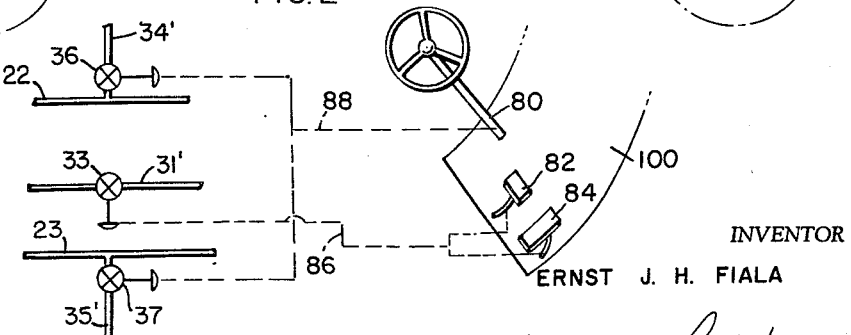

These and other objects, features and advantages of the present invention will become more obvious from the following description when taken in connection with the accompanying drawing, wherein FIGURE 1 illustrates one embodiment in accordance with the present invention, and FIGURE 2 illustrates a modification of the present invention.

Referring now to FIGURE 1 of the drawing, which illustrates a schematic arrangement of a spring equalization system in accordance with the present invention, reference numerals 10 and 11 designate the axle members, schematically illustrated therein, of the right and left front wheel, whereas reference numerals 12 and 13 designate the axle members, schematically illustrated therein, of the right and left rear wheels respectively, of the motor vehicle. Each axle member 10, 11, 12 and 13 is operatively connected with a piston 15 over a respective piston rod 14 which piston 15 is adapted to reciprocate in a cylinder 16. The cylinders 16 pass over into respective hydropneumatic springs 17, 18, 19 and 20 for the right and left front wheel and the right and left rear wheels, respectively. The flow of the hydraulic medium from cylinder 16 into the hydraulic pressure spaces 17', 18', 19' and 20' of the hydropneumatic springs 17, 18, 19 and 20, respectively, is damped by the bores 21 having a relatively small cross section. Lines 22, 23, 24 and 25 lead away from respective cylinder spaces 16, and branch off into two lines 122 and 222, 123 and 223, 124 and 224, and 125 and 225, respectively. The lines 122 through 125 lead to an equalization installation generally designated by reference numeral 26, while the lines 222 through 225 lead to a common spring generally designated by reference numeral 27.

The equalization installation 26 includes two stepped spool-like piston members 28 and 29, which are operatively connected and in hydraulic communication with one another by a connecting line 30. A hydropneumatic spring 31 is operatively connected with the line 30 over a line 31' whereby the spring 31 may be selectively connected or disconnected from the line 30 by means of a valve 33, shown only schematically in FIGURE 1, which in turn is actuated by an inertia member 32 such as a pendulum. The pendulum 32 is responsive during decelerations and accelerations in the driving direction indicated by the arrow A in this figure and thereby closes the line 31' and therewith disconnects the hydropneumatic spring 31 from the connecting line 30 during each acceleration or deceleration of the vehicle.

Hydropneumatic springs 34 and 35 are operatively connected with the lines 22 and 23 over connecting lines 34' and 35' whereby the lines 34' and 35' may again be closed off by valves 36 and 37, schematically illustrated in FIGURE 1. The valves 36 and 37 in turn are actuated by inertia members 38 and 39, respectively, such as pendulum members which are responsive to forces in the transverse direction of the vehicle and therewith effect a blocking or disengagement of the hydropneumatic springs 34 and 35 when transverse forces occur, i.e., when driving through a curve.

The lines 222, 223, 224 and 225 terminate in cylinders 40, 41, 42 and 43 respectively in each of which a corresponding piston member 40', 41', 42' and 43' are slidingly arranged. The pistons 40' through 43' are rigidly connected with each other by a cross member 44, while a piston member 45 operatively or rigidly connected with the cross member 44 extends from the latter into the oil space 46 of a hydropneumatic spring generally designated by reference numeral 47 and having a pneumatic pressure space 47'.

The spring 31 may be selectively connected or disconnected from line 30 by means of a valve 33 which is actuated by an inertia member 32, such as a pendulum, as schematically shown in FIGURE 1. It is also possible, however, to control the engaging and disengaging device, valve 33, for this spring by the brake and/or the gas pedal of the vehicle. Such a device is schematically shown in FIGURE 2 wherein conventional linkage means 86 operatively connects the brake pedal 82 and/or the gas pedal 84 of the vehicle which rest on the floor board 100 with the valve 33. This control linkage may be of any conventional type transmitting the forces applied to the brake and/or gas pedal into energy which would engage and disengage the valve 33 and would include any conventional electrical, hydraulic or mechanical linkage means. In a similar manner, the valves 36 and 37 which control auxiliary springs 34 and 35 may be operated by pendulum 38 or 39, respectively, as schematically shown in FIGURE 1. These valves may, however, be controlled by means of the steering mechanism through conventional linkage means 80 as schematically shown in FIGURE 2. Linkage means 88 operatively connects the steering mechanism 80 with valves 36 and 37 and may be of a device similar to the linkage 86.

OPERATION

The operation of the installation in accordance with the present invention will now be described by reference to some of the spring conditions which may occur while driving the vehicle.

(1) *Uni-Directional Movements of All Four Wheels*

When all four wheels move in the same direction resulting in spring movement parallel to the road surface, a pressure increase takes place in all lines 22, 122, 222, 23, 123, 223, 24, 124, 224, and 25, 125, 225. The pressure increase in these lines is the result of the fact that the individual pistons 15 are displaced upwardly and therewith displace the pressure fluid upwardly against the force of springs 17, 18, 19 and 20, though damped as a result of the throttling apertures 21, and therewith also increase correspondingly the pressure in the lines 22, 23, 24 and 25. By reason of the increase in pressure in these lines 22, 23, 24 and 25, the springs 34 and 35 become operative or responsive. Furthermore, the pistons 28 and 29 move as a result of the increase in pressure in the lines 122 through 125 toward each other, thereby increasing the pressure in line 30 so that the spring 31 is also operative or responsive. Finally, the increase in pressure in lines 222 through 225 produces a movement of the pistons 40' through 43' displacing the cross member 44 upwardly and thereby resulting in a further immersion of the piston member 45 in the pressure fluid disposed in pressure fluid space 46 of the hydropneumatic spring 27. Consequently, all of the eight aforementioned springs are operative or responsive, and a very soft overall spring system results therefrom.

(2) *Movement About a Vehicle Longitudinal Axis*

(a) DRIVING THROUGH CURVES

When driving through a curve, the springs 17 through 20 are operative or responsive. The pendulum members 38 and 39 are moved from the center position thereof by the centrifugal forces produced at that moment so that the springs 34 and 35 are operatively disengaged or disconnected, i.e., are rendered inoperative. No change in pressure results in line 30, so that the spring 31 also is non-responsive. However, in contrast thereto, the pistons 28 and 29 move into a new equilibrium position which is determined by the fact that the ratio of the pressure difference between the lines 22 and 23 to the pressure difference between the lines 24 and 25 is equal to the quotient of the effective piston surface 48 and the effective piston surface 49 of the pistons 28 and 29. By appropriate selection and choice of the surfaces 48 and 49, the ratio of this pressure difference may be thereby fixed as desired, and in this manner the oversteering or understeering behavior of the vehicle which depends on this pressure difference may be influenced. The pressure in the cylinders 40 to 43 increases in two of these cylinders while passing through a curve by a predetermined amount and decreases in the other two cylinders by exactly the same amount. Consequently, the cross member 44 with the piston 45 remains stationary and the spring 27 is non-responsive. The curve tilting or inclination of the vehicle is, therefore, determined exclusively by the stiffness of the springs 17 to 20 so that only a slight tilting or inclination occurs.

(b) UNI-DIRECTIONAL SHOCKS AT THE WHEELS OF ONE VEHICLE SIDE

When shocks occur which are directed in the same direction on both wheels of the same vehicle side, the pendulum members 38 and 39 are not responsive so that the springs 34 and 35 remain effective and the spring system is thereby rendered very soft about the longitudinal vehicle axis with the aid of the hydropneumatic springs 34 and 35.

(3) *Movement About a Vehicle Cross Axis*

(a) BRAKING OR ACCELERATION

When the vehicle is accelerated or decelerated, a uni-directional spring movement of the wheels belonging to the same axle in one direction and a uni-directional spring movement in the other direction of the wheels belonging to the other axle occur resulting in the so-called nodding or nose-dive movements. As a result of the deceleration or acceleration, the pendulum member 32 moves either forwardly or rearwardly and therewith disengages or disconnects the spring 31. The spring 27 also remains ineffective or non-responsive since two of the cylinders 40 to 43 receive an increased pressure, while the other two cylinders receive a correspondingly decreased pressure. However, springs 34 and 35 are effective. Furthermore, in order to render the acceleration or deceleration nodding movements even smaller, the valves 36 and 37 may also be so arranged and constructed as to be closed during deceleration or accelerations in the vehicle longitudinal direction so that in that case springs 34 and 35 are also rendered ineffective. As a result thereof, a still stiffer nodding or nose-dive movement spring characteristic is achieved.

(b) UNI-DIRECTIONAL SHOCKS AT THE WHEELS OF ONE AXLE MEMBER

If shocks directed in the same direction are received by the two wheels belonging to the same axle member, then the pendulum member 32 does not respond so that the spring 31 remains effective and the vehicle may absorb the shock in a very soft manner by a corresponding construction and design of the spring 31.

(4) *Uni-Directional Movement of Diagonally Arranged Wheels*

If two diagonally disposed wheels, for example, the left front wheel and the right rear wheel undergo spring movements in the same direction, for example, are lifted or raised, then at first the pressure in lines 23 and 24 increases. As a result thereof, the pistons 28 and 29 are displaced for such length of time until the same pressure is re-established in all four lines 22, 23, 24 and 25. Consequently, no torsional stresses are introduced into the frame or vehicle body of the vehicle.

While I have shown and described various embodiments in accordance with the present invention, it is understood that the same is not limited thereto but is susceptible of many changes and modifications within the scope and spirit of the present invention, and I, therefore, do not wish to be limited to the embodiments described only for purposes of illustration but intend to cover all such changes and modifications as encompassed by the scope of the appended claims.

I claim:
1. A fluid-operated equalization spring system for vehicles, especially motor vehicles having a plurality of front and rear wheels and a relatively stationary part, comprising equalization means including two piston members and connecting means operatively connecting said two piston members with each other, common spring means, individual spring means operatively connected with a respective wheel to spring support the same against said relatively stationary part, force-transmitting means for transmitting a portion of the forces absorbed by each wheel to a respective individual spring means and for transmitting another portion of said forces over a first branch line to said equalization means and over a second branch line to said common spring means from a respective one of each said wheels, auxiliary spring means operatively connected with said connecting means, auxiliary spring means operatively connected with said force-transmitting means, and control means for selectively rendering at least some of said auxiliary means ineffective during accelerations and decelerations of the vehicle and for rendering at least some of the other auxiliary spring means ineffective with the vehicle passing through a curve.

2. A fluid-operated equalization spring system for vehicles, according to claim 1, wherein said individual spring means, said auxiliary spring means and said common spring means are hydropneumatic springs, and wherein said connecting means operatively interconnects said two piston members in a hydraulic manner.

3. A fluid-operated equalization spring system for vehicles according to claim 2, wherein said control means includes inertia means for controlling said auxiliary spring means, and wherein said common spring means includes a cylinder operatively connected with a respective other branch line, a piston in each of said last-mentioned cylinders, and a common tensioning member for said common hydropneumatic spring means actuated by all of said last-mentioned pistons.

4. A fluid-operated equalization spring system for vehicles according to claim 3, wherein said two piston members have two dissimilar piston surfaces, and wherein each piston member is actuated on the two dissimilar surfaces thereof by a respective front and rear wheel over a respective one of said branch lines.

5. A fluid-operated equalization spring system for vehicles according to claim 1, wherein the auxiliary spring means operative on said force-transmitting means are rendered ineffective by said control means during accelerations and decelerations of the vehicle and wherein the auxiliary spring means operative on said connecting means is rendered ineffective with the vehicle traveling through a curve.

6. A fluid-operated equalization spring system for vehicles according to claim 5, wherein said auxiliary spring means operative on said force-transmitting means are also rendered inoperative by said control means with the vehicle traveling through a curve.

7. An equalization spring system for vehicles, especially motor vehicles, having a plurality of wheels, comprising equalization means including two piston-cylinder assemblies and force-transmitting means operatively interconnecting said two piston-cylinder assemblies with each other, common spring means, second force-transmitting means operatively connecting said wheels with respective piston-cylinder assemblies of said equalization means and with said common spring means, and at least one auxiliary spring means operative on one of two force-transmitting means, said two force-transmitting means consisting of the one operatively connecting said wheels with respective piston-cylinder assemblies of said equalization means and the one operatively interconnecting said piston-cylinder assemblies of said equalization means, said auxiliary spring means being adapted to be rendered effective and ineffective.

8. An equalization spring system according to claim 7, wherein there is a first auxiliary spring means operative on the force-transmitting means connecting said wheels with said equalization means and a second auxiliary spring means operative on the force-transmitting means interconnecting said piston-cylinder assemblies of said equalization means.

9. An equalization spring system for vehicles according to claim 8, wherein said first force-transmitting means includes branch line means for transmitting the forces absorbed by each individual wheel over a first branch line each to said common spring and over another branch line each to said equalization means.

10. An equalization spring system for vehicles according to claim 9, wherein said first force-transmitting means includes a fluid medium for transmitting the forces absorbed by each wheel, and wherein said common spring means includes a common tensioning member individually acted upon by the respective transmission lines operatively connected with a corresponding individual wheel.

11. An equalization spring system for vehicles according to claim 10, further comprising a relatively stationary part in said vehicle, individual spring means for spring supporting a respective wheel against said relatively stationary part, and further branch line means including a first parallel line for transmitting a portion of the forces absorbed by a respective wheel to the respective individual spring means and another parallel line for transmitting the other portion of the forces absorbed by said wheel to said first branch line means.

12. An equalization spring system for vehicles according to claim 11, wherein said individual spring means are provided with throttling means in said first parallel lines to thereby constitute effectively said individual spring means as shock absorbers.

13. An equalization spring system for vehicles, especially for motor vehicles, having a plurality of wheels, comprising equalization means including a plurality of individual elements and force-transmitting means operatively connecting at least some of said individual elements with each other, common spring means, second force-transmitting means operatively connecting each of said wheels with one of said elements of said equalization means and with said common spring means, at least one auxiliary spring means operative on one of two force-transmitting means, said two force-transmitting means consisting of the one operatively connecting said wheels with respective ones of said elements of said equalization means and the one operatively interconnecting said individual elements of said equalization means, and control means for rendering said auxiliary spring means ineffective.

14. A fluid-operated equalization spring system for vehicles according to claim 13, wherein said control means includes inertia means for selectively rendering ineffective at least part of said auxiliary spring means during acceleration and deceleration of the vehicle.

15. A fluid-operated equalization spring system for vehicles according to claim 14, wherein said inertia means is constructed as a pendulum member.

16. An equalization spring system for vehicles according to claim 13, wherein said control means includes brake pedal means and gas pedal means, and means selectively rendering at least part of said auxiliary spring means ineffective in dependence on the actuation of at least one of said pedal means.

17. An equalization spring system for vehicles according to claim 16, wherein said last-mentioned means operatively connects said auxiliary spring means to be operated in dependence on the actuation of both of said pedal means.

18. An equalization spring system for vehicles according to claim 13, wherein some of said auxiliary spring means are operative on the force-transmitting means operatively connecting said wheels with said equalization means, and wherein said control means includes inertia means for selectively controlling said last-mentioned auxiliary spring means to render the same ineffective while the vehicle travels in a curve and to render the same effective during straight drive.

19. An equalization spring system for vehicles according to claim 18, wherein said last-mentioned auxiliary spring means are hydropneumatic spring means, and wherein said inertia means are constructed as pendulum members.

20. An equalization spring system for vehicles according to claim 13, wherein at least one auxiliary spring means is operative on the force-transmitting means operatively connecting said wheels and said equalization means, and wherein said control means includes steering means, and means operatively connecting said steering means with the auxiliary spring means operative on the force-transmitting means between said wheels and said equalization means to selectively render the same effective and ineffective.

21. An equalization spring system for vehicles according to claim 20, wherein said control means includes means for rendering said last-mentioned auxiliary spring means ineffective with the vehicle traveling through a curve as well as during longitudinal accelerations and decelerations thereof.

22. A fluid-operated equalization spring system for vehicles, especially motor vehicles, having a plurality of front and rear wheels, comprising equalization means including two piston-cylinder assemblies each including a piston having a first and a second piston surface, said first and second piston surfaces having different effective areas, and hydraulic force-transmitting means interconnecting said two piston-cylinder assemblies, common spring means, and force-transmitting means operatively connecting each of said wheels with a respective one of said piston surfaces of said equalization means and with said common spring means, said second force-transmitting means operatively connecting a respective front and rear wheel to the first and second piston surfaces of each of the two piston-cylinder assemblies, at least one auxiliary spring means operative on one of two force-transmittig means, said two force-transmitting means consisting of the one operatively interconnecting said two piston-cylinder assemblies and the one operatively connecting said wheels with said piston surfaces of the equalization means, and control means for selectively rendering said auxiliary spring means ineffective.

23. A fluid-operated equalization spring system for vehicles according to claim 22, wherein one of said auxiliary spring means is operative on the force-transmitting means operatively interconnecting said piston-cylinder assemblies, and wherein said control means includes brake pedal means and gas pedal means, and means for controlling said one auxiliary spring means in dependence on at least one of said two pedal means.

24. An equalization spring system for vehicles according to claim 22, wherein the first force-transmitting means operatively connecting the wheels with said equalization means includes branch line means for transmitting a portion of the forces absorbed by each individual wheel over a first line to said common spring means and over a second line to said equalization means.

25. An equalization spring system according to claim 24, wherein said common spring means includes a common tensioning member, and wherein said common tensioning member is acted upon by the forces absorbed by the individual wheels transmitted over said other branch lines.

26. An equalization spring system for vehicles according to claim 25, further comprising individual spring means for each wheel for spring supporting the same against a relatively stationary part of the vehicle, and further branch line means for transmitting a portion of the forces absorbed by each wheel to a corresponding individual spring means and for transmittig another portion of the forces absorbed thereby to said first branch line means.

27. A fluid-operated equalization spring system for vehicles, especially motor vehicles, having a plurality of front and rear wheels, comprising equalization means including two piston-cylinder assemblies each including a piston having a first and a second piston surface, said first and second piston surfaces having different effective areas, and hydraulic force-transmitting means interconnecting said two piston-cylinder assemblies, common spring means, and second force-transmitting means operatively connecting each of said wheels with a respective one of said piston surfaces of said equalization means and with said common spring means, said second force-transmitting means operatively connecting a respective front and rear wheel to the first and second piston surfaces of each of the two piston-cylinder assemblies, auxiliary spring means including spring means operatively connected with the force-transmitting means operatively interconnecting said two piston-cylinder assemblies and spring means operatively connected with the force-transmitting means operatively connecting said wheels with said piston surfaces of the equalization means, and control means for selectively rendering said auxiliary spring means ineffective.

References Cited in the file of this patent

UNITED STATES PATENTS

| | | |
|---|---|---|
| 1,094,567 | Hofmann | Apr. 28, 1914 |
| 2,133,279 | Brown | Oct. 18, 1938 |
| 2,843,396 | Lucien | July 15, 1958 |

FOREIGN PATENTS

| | | |
|---|---|---|
| 68,500 | France | Nov. 12, 1957 |
| (Addition to No. 1,100,585) | | |